United States Patent [19]
Hewitt

[11] Patent Number: 5,918,073
[45] Date of Patent: Jun. 29, 1999

[54] SYSTEM AND METHOD FOR EQUALIZING DATA BUFFER STORAGE AND FETCH RATES OF PERIPHERAL DEVICES

[75] Inventor: Larry D. Hewitt, Austin, Tex.

[73] Assignee: Advanced Micro Devices, Inc., Sunnyvale, Calif.

[21] Appl. No.: 08/884,432

[22] Filed: Jun. 27, 1997

[51] Int. Cl.$^6$ .................................................. G06F 3/00
[52] U.S. Cl. ..................... 395/872; 395/882; 395/558; 377/47
[58] Field of Search ..................... 395/558, 872, 395/880, 882, 308, 360, 556, 325, 375, 425, 750.04; 377/47

[56] References Cited

U.S. PATENT DOCUMENTS

| | | | |
|---|---|---|---|
| 4,464,772 | 8/1984 | Buckley et al. | 377/47 |
| 4,835,684 | 5/1989 | Kanai | 364/200 |
| 5,167,024 | 11/1992 | Smith et al. | 395/335 |
| 5,263,172 | 11/1993 | Olnowich | 395/360 |
| 5,309,568 | 5/1994 | Ghosh et al. | 395/325 |
| 5,327,121 | 7/1994 | Antles, II | 340/825.51 |
| 5,392,422 | 2/1995 | Hoel et al. | 395/550 |
| 5,404,462 | 4/1995 | Datwyler et al. | 395/325 |
| 5,404,480 | 4/1995 | Suzuki | 395/425 |
| 5,471,587 | 11/1995 | Fernando | 395/309 |
| 5,493,684 | 2/1996 | Gephardt et al. | 395/750 |
| 5,511,013 | 4/1996 | Tokieda et al. | 364/707 |
| 5,524,270 | 6/1996 | Haess et al. | 395/880 |
| 5,594,926 | 1/1997 | Chang et al. | 395/872 |
| 5,717,154 | 2/1998 | Gulick | 84/604 |
| 5,729,767 | 3/1998 | Jones et al. | 395/882 |
| 5,761,457 | 6/1998 | Gulick | 395/308 |
| 5,774,745 | 6/1998 | Ecclesine | 395/872 |
| 5,778,218 | 7/1998 | Gulick | 395/558 |
| 5,860,119 | 1/1999 | Dockser | 711/156 |

FOREIGN PATENT DOCUMENTS

| | | |
|---|---|---|
| 0 453 199 A2 | 10/1991 | European Pat. Off. . |
| 0 613 074 A1 | 8/1994 | European Pat. Off. . |

OTHER PUBLICATIONS

Bailey, Michael, "PCI Local Bus Breaks Data Bottleneck To Open Up PC Technology," Computer Technology Review, Sep. 12, 1993, No. 11, Los Angeles, CA, US, pp. 15–17.

PCI Local Bus, Chapter 7, 66 MHz PCI Specification, Revision 2.1, pp. 171–184, Jul. 1993.

European Search Report for Application No. 95305759.3, dated Nov. 16, 1995.

*Primary Examiner*—Hassan Kizou
*Assistant Examiner*—Rijue Mai
*Attorney, Agent, or Firm*—Conley, Rose & Tayon, PC; B. Noel Kivlin

[57] ABSTRACT

A system and method are presented for equalizing data buffer storage and fetch rates of peripheral devices. A computer system of the present invention includes a central processing unit (CPU), first and second peripheral devices, and a data buffer. The first peripheral device stores data within the data buffer, and the second peripheral device fetches data from the data buffer. A fraction of the data buffer contains unread data (i.e. data stored within the data buffer by the first peripheral device and not yet fetched by the second peripheral device). The first peripheral device includes a reload register, the contents of which determines the rate at which the first peripheral device stores data within the data buffer. The CPU produces a reload value, which is stored within the reload register, such that the rate at which the first peripheral device stores the data within the data buffer is made substantially equal to the rate at which the second peripheral device fetches the data from the data buffer. The data buffer is preferably operated a first-in-first-out manner, and includes a write pointer and a read pointer. The CPU preferably produces the reload value such that approximately half the memory locations within the data buffer contain unread data at any given time.

21 Claims, 5 Drawing Sheets

SYSTEM AND METHOD FOR EQUALIZING DATA BUFFER STORAGE AND FETCH RATES OF PERIPHERAL DEVICES

BACKGROUND OF THE INVENTION

1. Field of Invention

This invention relates to computer system peripheral devices and more specifically to synchronizing the real-time operations of computer system peripheral devices.

2. Description of Related Art

Most computer communication systems are designed for asynchronous data exchange. For example, a typical computer system includes an expansion bus adapted for coupling to one or more peripheral devices. Typical peripheral devices such as disk and CD-ROM drives generate and transmit multiple data units (i.e., blocks of data) in bursts followed by relatively long idle periods. Such peripheral devices arbitrate for control of the expansion bus in order to transfer data, and transmit the blocks of data according to a selected set of rules (i.e., protocol) during each expansion bus access period. Similarly, most network communication systems (e.g., local area networks) are also designed for asynchronous data communications. A typical network communication system includes multiple network devices (e.g., computer systems) connected to a common transmission medium (e.g., coaxial cable or twisted-pair cable). The network devices arbitrate for control of the transmission medium. Upon gaining control of the transmission medium, a given network device typically encapsulates packets into "frames" according to a selected network protocol and transmits the frames over the transmission medium. Each packet includes address and control information used to route the packet to its destination. Asynchronous data exchange allows bus and network communication systems to handle the "bursty" nature of data communications in an efficient manner.

A problem arises when two peripheral devices of a computer system exchange real-time audio or video information via, for example, the expansion bus. Reproduction of a live or recorded audio or video performance requires a substantially continuous flow of information. A data buffer is typically provided between a sending peripheral device and a receiving peripheral device in order to even out the flow of data. The sending device stores data within the data buffer, and the receiving device fetches the data from the data buffer as needed in order to reproduce the audio or video performance. Each peripheral device, however, typically includes a different clock generation circuit which determines the rate at which the device accesses the data buffer. Over time, if the sending device adds data to the data buffer faster than the receiving device fetches data from the data buffer, the data buffer will become full, data which cannot be stored within the data buffer will be lost, and the audio or video reproduction will be interrupted. Such a condition is known as data buffer overflow. Conversely, if the receiving device fetches data from the data buffer faster than the sending device adds data to the data buffer over time, the data buffer will eventually become empty and the audio or video reproduction will be interrupted. In this case, the result is a data buffer underflow condition. Unfortunately, no two clock generation circuits will operate at precisely the same frequency without external synchronization, and hardware synchronization methods require a direct connection between the two circuits for the exchange of timing information.

It would thus be desirable to have a system and method for synchronizing the data rates of devices exchanging real-time audio or video information. Such a system would not require a hardware connection between the two devices for synchronization, yet would substantially synchronize the operations of the devices in order to prevent data buffer overflow and underflow conditions.

SUMMARY OF THE INVENTION

The problems outlined above are in large part solved by a system and method for equalizing the rate at which a first peripheral device stores data within a data buffer and the rate at which a second peripheral device fetches the data from the data buffer. In one embodiment, a computer system includes a central processing unit (CPU) along with the first and second peripheral devices and the data buffer. The data buffer is configured to store data, and a fraction of the data buffer contains unread data (i.e. data stored within the data buffer by the first peripheral device and not yet fetched by the second peripheral device). The first peripheral device includes a reload register, the contents of which determines the rate at which the first peripheral device stores data within the data buffer. The CPU produces a reload value, which is stored within the reload register, such that the rate at which the first peripheral device stores the data within the data buffer is substantially equal to the rate at which the second peripheral device fetches the data from the data buffer.

The data buffer is preferably operated a first-in-first-out manner, and includes a write pointer and a read pointer. The write pointer is the address of the next memory location within the data buffer available for storing data (i.e., the next available "empty" memory location). The read pointer is the address of the next memory location within the data buffer containing data not yet read by the second peripheral device (i.e., containing unread data). The number of memory locations between the write pointer and the read pointer is the number of memory locations containing unread data. The CPU preferably produces the reload value such that approximately half the memory locations within the data buffer contain unread data at any given time.

The embodiment of the computer system includes a system memory, and the data buffer is a portion of the system memory. The first peripheral device generates data in sets (i.e., blocks of data), and includes a divider circuit which produces a signal used to initiate block data generation. The divider circuit includes a binary down counter in addition to the reload register. The binary down counter produces multiple output signals. Bit positions of the reload register correspond to output signals of the counter, and the most significant output signal of the counter is used to initiate block data generation by the first peripheral device. The binary down counter receives a master clock signal, generated within the first peripheral device, and is decremented during each cycle of the master clock signal. When all of the counter output signals are 0, the outputs are set to the contents of the reload register. The rate at which data is stored within the data buffer by the first peripheral device is thus made dependent upon the contents of the reload register.

During employment of the method of the present invention, the fraction of the data buffer containing unread data is determined. This may be accomplished by obtaining the write and read pointer values, adjusting the write pointer value to include an appropriate portion of the block of data currently being generated, and determining the number of memory locations between the adjusted write pointer value and the read pointer value. The fraction is then used to compute a required reload value delta. The reload value delta is then added to the current reload value to compute a new reload value. The new reload value is then stored within the reload register of the first peripheral device. The reload value delta is: (i) 0 when the fraction of the data buffer containing unread data is approximately equal to half of the total number of memory locations within the data buffer, (ii) positive when the fraction of the data buffer containing unread data is substantially greater than half of the total number of memory locations within the data buffer, and (iii) negative when the number of memory locations between the read pointer and the adjusted write pointer is substantially less than half of the total number of memory locations within the data buffer.

BRIEF DESCRIPTION OF THE DRAWINGS

Other objects and advantages of the invention will become apparent upon reading the following detailed description and upon reference to the accompanying drawings in which.

Figure 1:
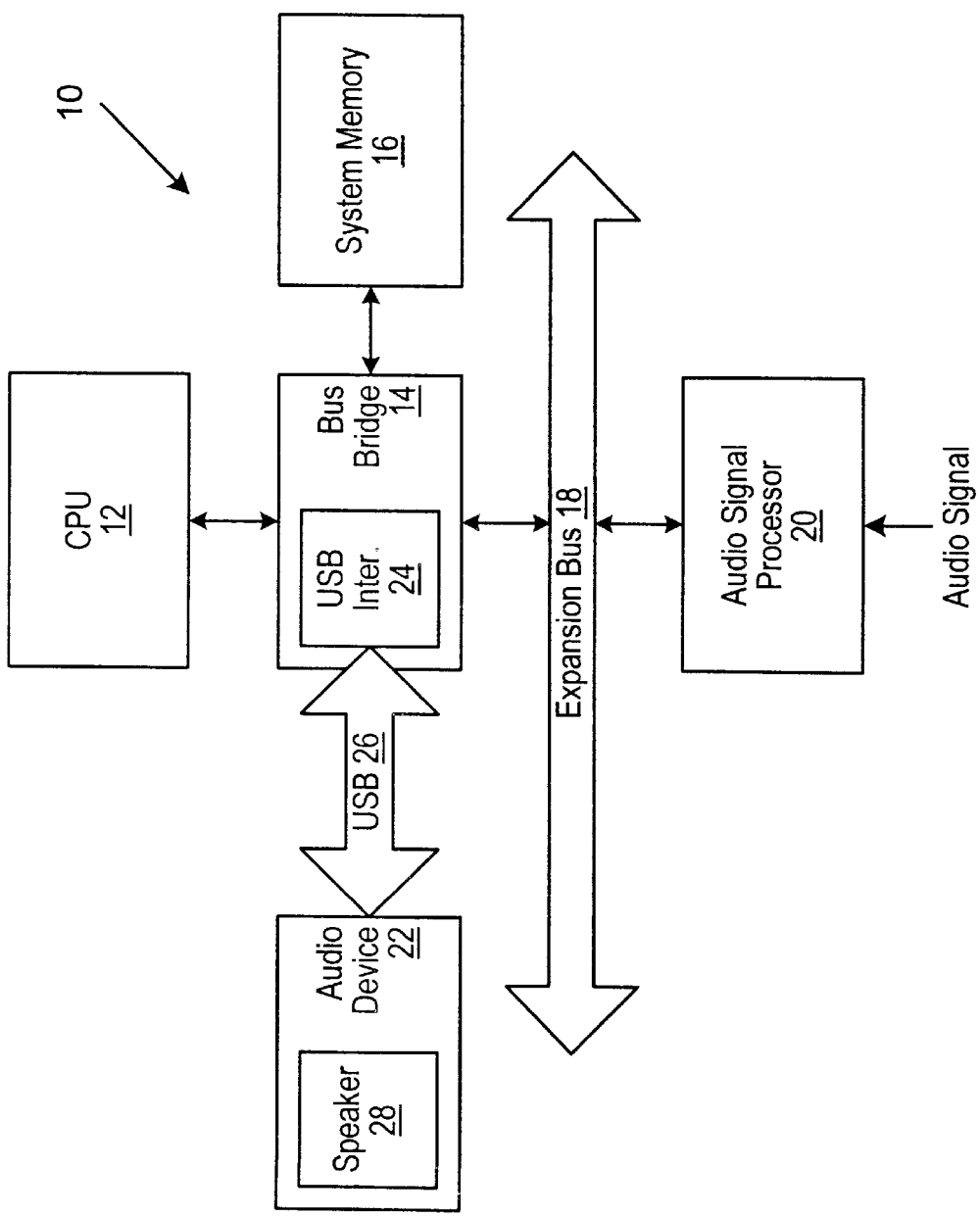
FIG. 1 is a block diagram of one embodiment of a computer system in accordance with the present invention, wherein the computer system includes a system memory, an audio signal processor which stores data within a data buffer portion of the system memory, and an audio device which fetches data from the data buffer portion of the system memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 is a block diagram of one embodiment of a computer system 10 in accordance with the present invention. Computer system 10 includes a CPU 12, a bus bridge 14, a system memory 16, an expansion bus 18, an audio signal processor 20, and an audio device 22. Audio signal processor 20 samples an audio signal periodically in response to a first clock signal generated within audio signal processor 20, and stores resultant digitized values within a data buffer (e.g., a portion of system memory 16). Audio device 22 fetches the digitized values from the data buffer as needed and in response to a second clock signal generated within audio device 22 in order to reproduce the audio signal. Audio device 22 includes a speaker 28 in order to reproduce the audio signal. Computer system 10 includes a means of equalizing the rate at which audio signal processor 20 stores digitized values within the data buffer and the rate at which audio device 22 fetches the digitized values from the data buffer in order to prevent data buffer overflow and underflow conditions.

CPU 12 is configured to execute instructions, preferably x86 instructions. Expansion bus 18 includes address, data, and control lines, and is adapted for coupling to one or more peripheral devices. Expansion bus 18 may be, for example, a peripheral component interconnect (PCI) bus, a Video Electronics Standards Association (VESA) VL bus, an industry standard architecture (ISA) bus, an extended industry standard architecture (EISA) bus, or a Micro Channel architecture (MCA) bus. System memory 16 is configured to store data. Bus bridge 14 is coupled to CPU 12, system memory 16, and expansion bus 18. Bus bridge 14 functions as an interface between CPU 12 and system memory 16, and between CPU 12 and expansion bus 18. Bus bridge 14 preferably includes a memory controller. CPU 12 obtains instructions and data (i.e., reads) from system memory 16 via bus bridge 14, and stores data (i.e., writes) to system memory 16 via bus bridge 14.

Computer system 10 also includes a universal serial bus (USB) 26. Bus bridge 14 includes a USB interface 24 coupled to a USB 26. USB 26 is operated according to the USB standard, which includes the capability to exchange data at regular time intervals in order to support audio and/or video reproductions (i.e., "isochronous" data transmission capability). USB interface 24 functions as an interface between audio device 22 and CPU 12, between audio device 22 and system memory 16, and between audio device 22 and peripheral devices coupled to expansion bus 18 (e.g., audio signal processor 20).

Audio signal processor 20 conditions the audio signal (e.g., filters, amplifies, etc.), periodically samples the conditioned audio signal, and converts the samples to corresponding digital values (i.e., digitizes the samples). Audio signal processor 20 stores the resultant digitized values within the data buffer. The data buffer may be, for example, a designated portion of system memory 16. Audio device 22 fetches the digitized values from the data buffer via USB interface 24 and bus bridge 14 as needed in order to reproduce the audio signal. Audio device 22 converts the digitized values to corresponding analog values, and provides the resultant audio signal to speaker 28. Speaker 28 reproduces the original sound embodied within the audio signal.

It is noted that in other embodiments audio device 22 may not include speaker 28. Instead, audio device 22 may have electrical connections for coupling an external speaker to audio device 22, and audio device 22 may be configured to drive the external speaker.

Figure 2:
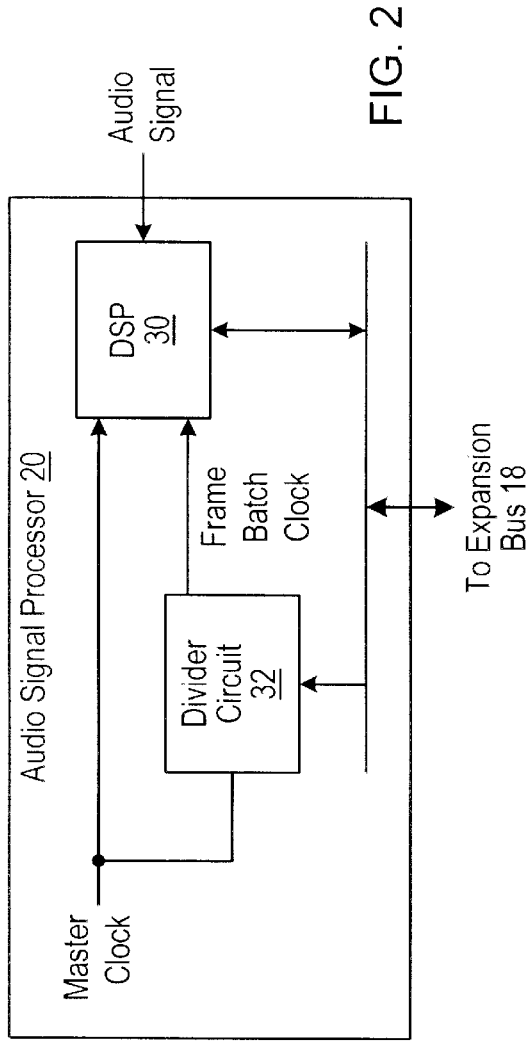
FIG. 2 is a block diagram of one embodiment of the audio signal processor if FIG. 1, wherein the audio signal processor includes a digital signal processor (DSP) and a divider circuit.

FIG. 2 is a block diagram of one embodiment of audio signal processor 20. Audio signal processor 20 includes a digital signal processor (DSP) 30 and a divider circuit 32. DSP 30 receives the audio signal and is coupled to expansion bus 18. DSP 30 periodically samples the audio signal and produces corresponding digitized values. Audio signal processor 20 drives each digitized value produced by DSP 30 onto the data lines of expansion bus 18, and drives address and control lines of expansion bus 18 with values necessary to store the digitized value within the data buffer. Operations performed within DSP 30 are synchronized by a master clock signal produced by a clock generation circuit (not shown) within audio signal processor 20. The master clock signal has a predetermined frequency and corresponding period equal to the inverse of the frequency. DSP 30 initiates processing of a predetermined number of audio signal samples (e.g., 32 samples) in response to a frame batch clock signal produced by divider circuit 32. Divider circuit 32 receives the master clock signal and derives the frame batch clock signal from the master clock signal.

Figure 3:
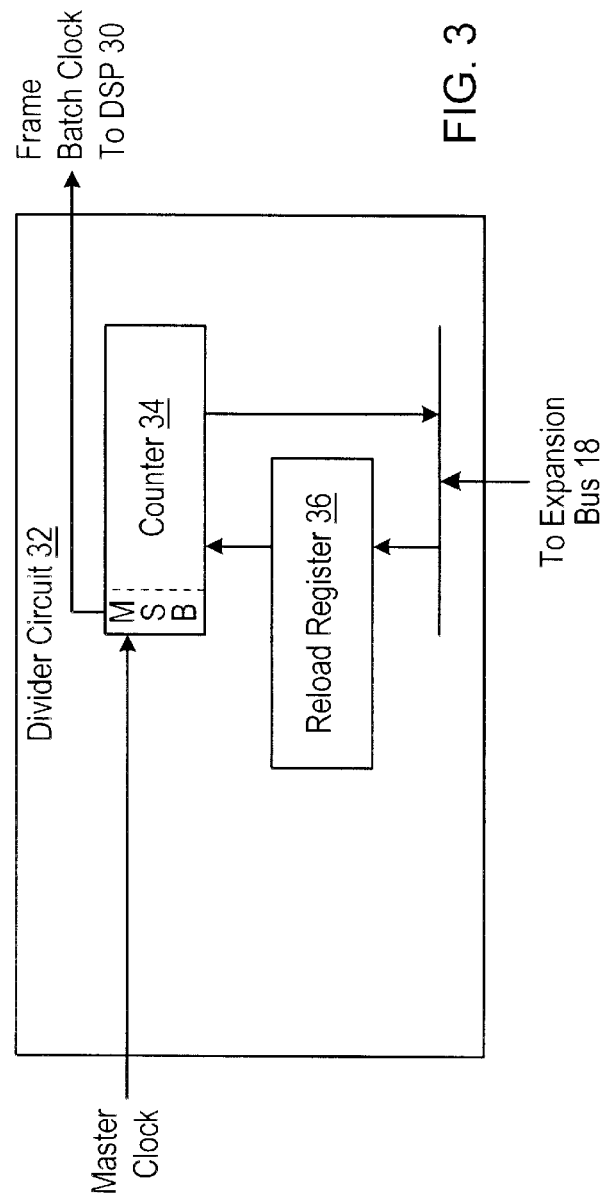
FIG. 3 is a block diagram of one embodiment of the divider circuit of FIG. 2, wherein the divider circuit includes a counter and a reload register.

FIG. 3 is a block diagram of one embodiment of divider circuit 32. Divider circuit 32 includes a counter 34 and a reload register 36. Counter 34 produces multiple binary output signals (i.e., having values of 0 or 1) ordered such that they represent a binary digital value. Counter 34 receives the master clock signal, and the output signals change in response to the master clock signal. Counter 34 operates such that the binary digital value formed by the ordered output signals is decremented by one during each cycle of the master clock signal (i.e., counter 34 is a "binary down counter"). Reload register 36 is coupled to counter 34, and includes a number of bit positions (i.e., memory cells) equal to the number of output signals produced by counter 34. When the values of all output signals of counter 34 are 0, the output signals are set (i.e., "preset") to the values of the corresponding bit positions of reload register 36. The frame batch clock signal produced by divider circuit 32 is the value of the most significant bit (MSB) of the binary digital value formed by the ordered output signals of counter 34. The frequency and corresponding period of the frame batch clock signal are dependent upon the contents of reload register 36.

Figure 4:
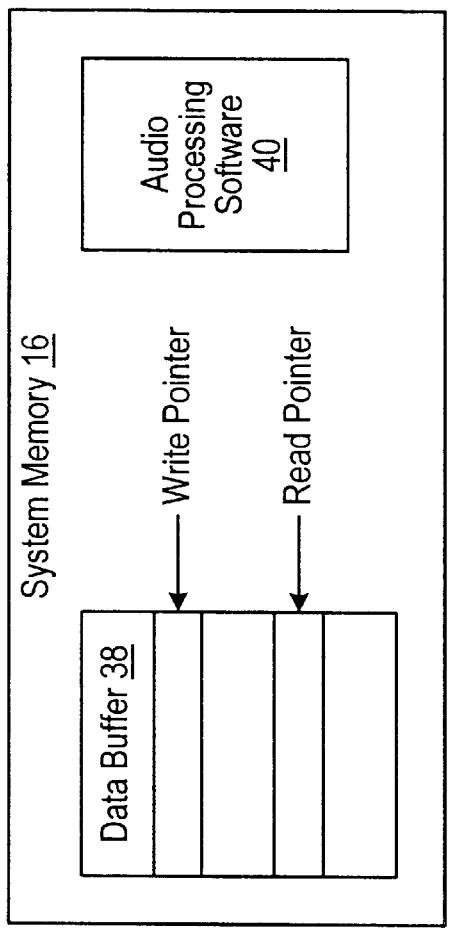
FIG. 4 is a block diagram of one embodiment of the system memory of FIG. 1, wherein the system memory includes audio processing software in addition to the data buffer portion.

FIG. 4 is a block diagram of one embodiment of system memory 16. System memory 16 includes a data buffer 38 and audio processing instructions and data (i.e., software) 40. Data buffer 38 includes multiple memory locations for storing data, a write pointer, and a read pointer. The write pointer is the address of the next available (i.e., "empty") memory location within the data buffer, and the read pointer is the address of the next memory location containing unread data within the data buffer. During a data buffer write operation, a digitized value is stored within data buffer 38 by writing the digitized value to the address contained within (i.e., "pointed to by") the write pointer. During a data buffer read operation, a digitized value is retrieved from data buffer 38 by reading data from the address contained within (i.e., "pointed to by") the read pointer. A portion of data buffer 38 between the read pointer value and the write pointer value contains unread data (i.e., data stored within data buffer 38 by audio signal processor 20 and not yet fetched by audio device 22).

Audio processing software 40 includes instructions and data which implement the means of equalizing the rate at which audio signal processor 20 stores digitized values within data buffer 38 and the rate at which audio device 22 fetches the digitized values from data buffer 38 in order to prevent data buffer 38 overflow and underflow conditions. CPU 12 executes audio processing software 40 during operation of computer system 10. Under the control of audio processing software 40, CPU 12 periodically generates a reload value and stores the reload value within reload register 36 of divider circuit 32. The reload value effectively regulates the rate at which audio signal processor 20 generates and stores digitized data within data buffer 38. The reload value is preferably generated in order to maintain the level of unread data within data buffer 38 at approximately half the number of locations within data buffer 38. CPU 12 preferably executes the portion of audio processing software 40 involving the generation of the reload value in response to an interrupt request signal generated by a timer circuit. The time period between interrupts is selected to be as long as possible while providing adequate control over the level of unread data within data buffer 38. It is believed a time period of approximately 250 milliseconds between interrupts is sufficient.

Due to the processing of groups (i.e., "batches") of audio signal samples by DSP 30, the value of the write pointer of data buffer 38 must be adjusted to include the fractions of the groups which have been processed. As counter 34 is a down counter, an adjusted write pointer value 'AWP' is computed according to the following equation:

$$AWP = WP + \{[(\text{reload value} - \text{current counter value})/(\text{reload value})] \cdot N\}$$
$$= WP + \{[1 - (\text{current counter value/reload value})] \cdot N\}$$

where: WP=current write pointer value, and
N=number of samples processed as a group by DSP 30
For example, assume the reload value is 'BB12h'(47,890) and DSP 30 processes 32 samples as a group. When a timer interrupt is received, assume the write pointer value is '1020h', and the current binary digital value produced by counter 34 is '0BB1h'(2,993). DSP 30 has processed approximately 30 of the group of 32 samples, and the adjusted write pointer value AWP is 1020h+001Eh=103Eh. The number of memory locations between the adjusted write pointer value AWP and the read pointer value, hereinafter referred to as "the adjusted write-read pointer differential", more accurately reflects the number of memory locations within data buffer 38 containing unread data.

Figure 5:
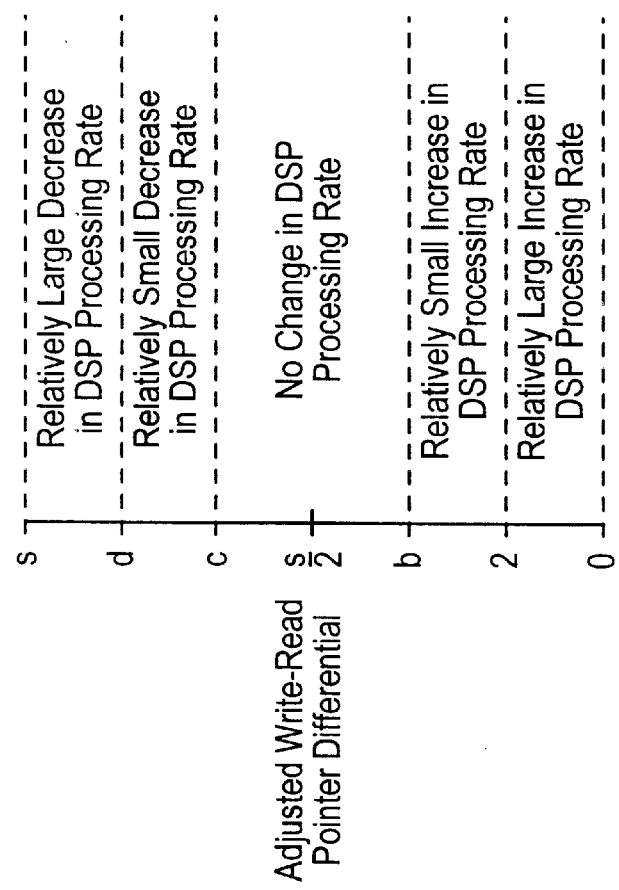
FIG. 5 is a chart illustrating one embodiment of the control mechanism within the audio processing software of FIG. 4, wherein the rate at which the audio signal processor stores digitized values within the data buffer is varied.

FIG. 5 is a chart illustrating one embodiment of the control mechanism within audio processing software 40 used to equalize the rate at which audio signal processor 20 stores digitized values within data buffer 38 and the rate at which audio device 22 fetches the digitized values from data buffer 38. The adjusted write-read pointer differential may vary from 0 to S, where S is the size of data buffer 38 (i.e., the number of memory locations within data buffer 38). The objective is to maintain the adjusted write-read pointer differential approximately equal to half of S (i.e., S/2). CPU 12 uses the adjusted write-read pointer differential to compute the reload value. In a range between values b and c surrounding S/2, where 0<b<S/2<c<S, the current reload value is sufficient to maintain the level of unread data within data buffer 38 at about S/2, and CPU 12 makes no change to the current reload value.

In a second range between values a and b below S/2, where 0<a<b<S/2, audio device 22 is fetching data from data buffer 38 at a faster rate than audio signal processor 20 is storing data within data buffer 38, and CPU 12 makes a relatively small decrease in the current reload value in order to increase the rate at which audio signal processor 20 processes data. In a third range between 0 and value a, audio device 22 is again fetching data from data buffer 38 faster than audio signal processor 20 is storing data within data buffer 38, and the danger of a data underflow condition exists within data buffer 38. In response, CPU 12 makes a relatively large decrease in current reload value in an effort to restore the level of unread data within data buffer 38 to approximately S/2.

Similar measures are employed when the level of unread data within data buffer 38 exceeds S/2. In a fourth range between values c and d above S/2, where S/2<c<d<S, audio signal processor 20 is storing data within data buffer 38 faster than audio device 22 is fetching data from data buffer 38, and CPU 12 makes a relatively small increase in current reload value in order to decrease the rate at which audio signal processor 20 is processing data. In a fifth range between d and S, audio signal processor 20 is again storing data within data buffer 38 at a faster rate than audio device 22 is fetching data from data buffer 38, and the danger of a data overflow condition exists within data buffer 38. In response, CPU 12 makes a relatively large increase in current reload value in an effort to restore the level of unread data within data buffer 38 to approximately S/2.

Figure 6:
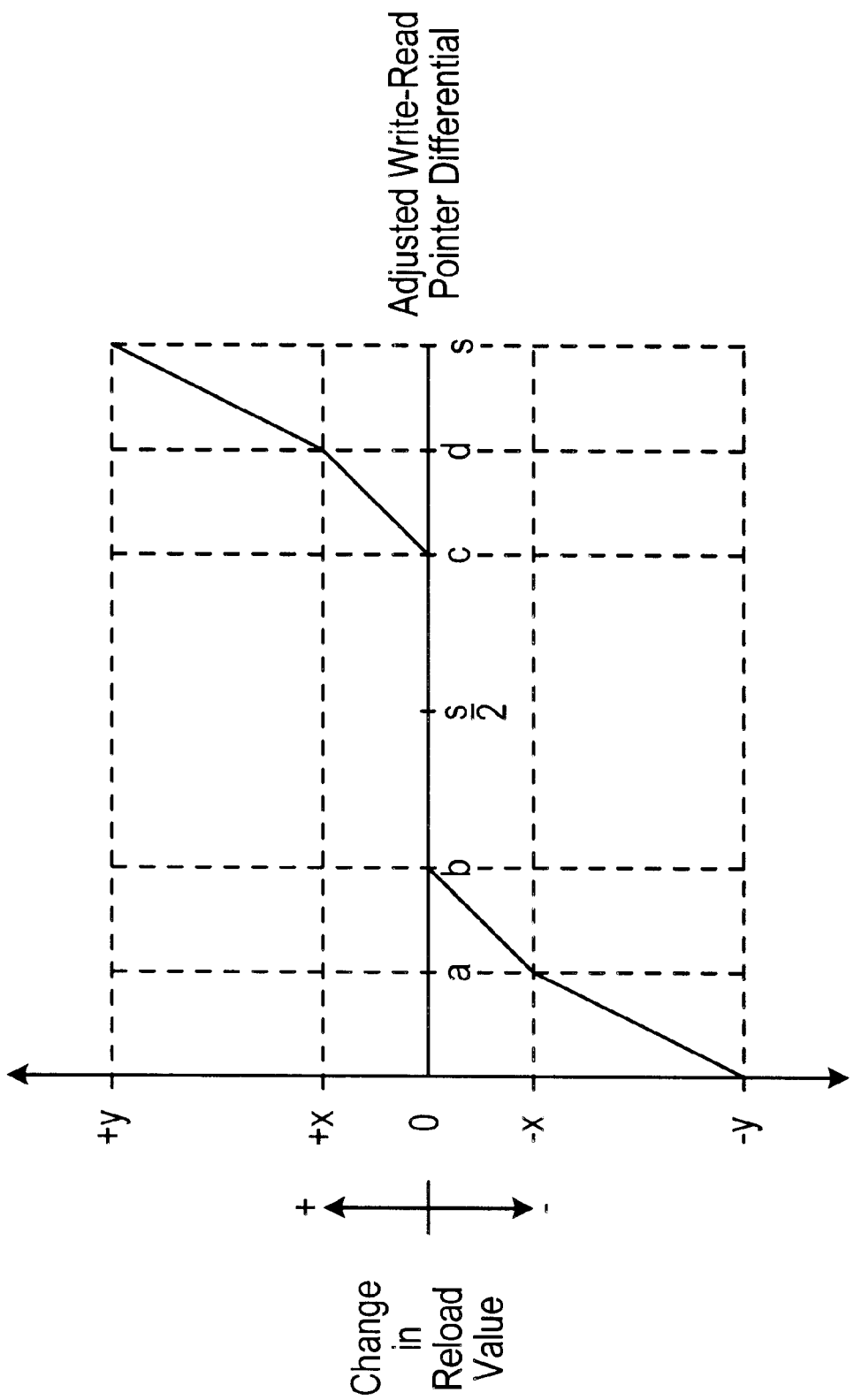
FIG. 6 is a graph of the change in reload value versus the number of memory locations between an adjusted write pointer value and a read pointer value (i.e., adjusted write-read pointer differential) illustrating one embodiment of the control mechanism of FIG. 5, wherein the change in reload value is a piece-wise linear function of the adjusted write-read pointer differential.

FIG. 6 is a graph of the change in reload value versus the adjusted write-read pointer differential illustrating one embodiment of the control mechanism of FIG. 5. The change in reload value is a piece-wise linear function of the adjusted write-read pointer differential. When the adjusted write-read pointer differential is between b and c, the current reload value is adequate and is not changed. When the adjusted write-read pointer differential is between a and b, audio device 22 is fetching data from data buffer 38 at a faster rate than audio signal processor 20 is storing data within data buffer 38, and CPU 12 makes a relatively small decrease in the current reload value in order to increase the rate at which audio signal processor 20 processes data. The change in reload value decreases linearly with decreasing adjusted write-read pointer differential. The change in reload value is 0 at adjusted write-read pointer differential value of b, and reaches a minimum value of -x corresponding to an adjusted write-read pointer differential value of a.

When the adjusted write-read pointer differential is between 0 and a, audio device 22 is again fetching data from data buffer 38 at a faster rate than audio signal processor 20 is storing data within data buffer 38, and the danger of a data underflow condition within data buffer 38 exists. CPU 12 makes a relatively large decrease in the current reload value in order to increase the rate at which audio signal processor 20 processes data. The change in reload value decreases linearly with decreasing adjusted write-read pointer differential. The change in reload value is -x at adjusted write-read pointer differential value of a, and reaches a minimum value of -y corresponding to an adjusted write-read pointer differential value of 0. The rate of change of the reload value between adjusted write-read pointer differential values 0 and a is greater than the rate of change between adjusted write-read pointer differential values a and b.

When the adjusted write-read pointer differential is between c and d, audio signal processor 20 is storing data within data buffer 38 faster than audio device 22 is fetching data from data buffer 38, and CPU 12 makes a relatively small increase in the current reload value in order to decrease the rate at which audio signal processor 20 processes data. The change in reload value increases linearly with increasing adjusted write-read pointer differential. The change in reload value is 0 at adjusted write-read pointer differential value of c, and reaches a maximum value of +x corresponding to an adjusted write-read pointer differential value of d.

When the adjusted write-read pointer differential is between d and S, audio signal processor 20 is storing data within data buffer 38 faster than audio device 22 is fetching data from data buffer 38, and the danger of a data overflow condition within data buffer 38 exists. CPU 12 makes a relatively large increase in the current reload value in order to decrease the rate at which audio signal processor 20 processes data. The change in reload value increases linearly with increasing adjusted write-read pointer differential. The change in reload value is +x at adjusted write-read pointer differential value of d, and reaches a maximum value of +y corresponding to an adjusted write-read pointer differential value of S. The rate of change of the reload value between adjusted write-read pointer differential values d and S is greater than the rate of change between adjusted write-read pointer differential values c and d.

Figure 7:
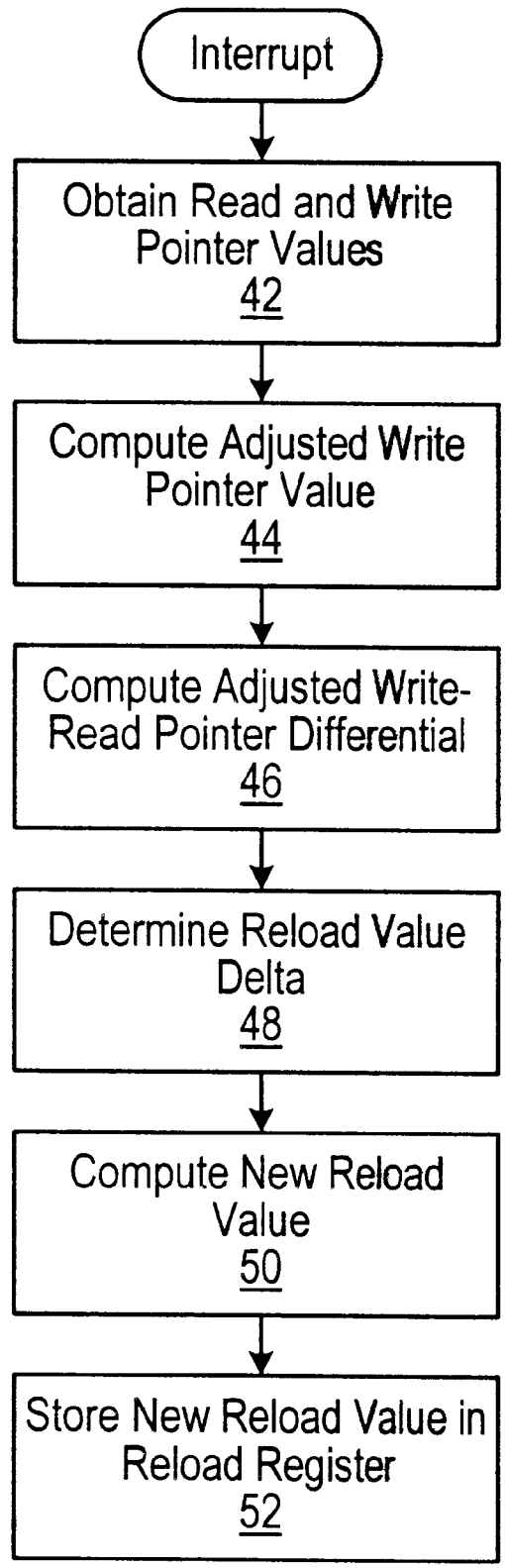
FIG. 7 is a flow chart of the present method for equalizing the rate at which the audio signal processor stores data within the data buffer and the rate at which the audio device fetches the data from the data buffer.

FIG. 7 is a flow chart of a method for equalizing the rate at which audio signal processor 20 stores data within data buffer 38 and the rate at which audio device 22 fetches the data from data buffer 38. Employment of the method is preferably triggered by an interrupt signal. In a first step 42, the current read and write pointer values are obtained. The write pointer value is adjusted as described above to include an appropriate portion of the data currently undergoing processing (i.e., being generated) within the first peripheral device during a step 44. During a step 46, the number of memory locations between the adjusted write pointer value and the read pointer value (i.e., the adjusted write-read pointer differential) is computed. The required reload value change (i.e., delta) is computed as described above during a step 48. During a step 50, the reload value delta is added to the current reload value in order to compute a new reload value. The new reload value is stored within the reload register during a step 52.

Numerous variations and modifications will become apparent to those skilled in the art once the above disclosure is fully appreciated. It is intended that the following claims be interpreted to embrace all such variations and modifications.

What is claimed is:

1. A computer system, comprising:

a data buffer configured to store data, wherein a fraction of the data buffer contains unread data;

a central processing unit (CPU) operably coupled to the data buffer and configured to determine the fraction of the data buffer containing unread data and to produce a reload value in response to the fraction;

a first peripheral device operably coupled to the data buffer and to the CPU, wherein the first peripheral device is configured to produce a plurality of data prior to storing the plurality of data within the data buffer, and wherein the first peripheral device comprises a reload register, and wherein the rate at which the first peripheral device stores the data within the data buffer is dependent upon the contents of the reload register, and wherein the first peripheral device is configured to receive the reload value and to store the reload value within the reload register;

a second peripheral device operably coupled to the data buffer, wherein the second peripheral device is configured to fetch the data from the data buffer;

wherein the data buffer includes a read and write pointers, and wherein the write pointer is the address of the next available memory location within the data buffer for storing data, and wherein the read pointer is the address of the next memory location containing unread data within the data buffer; and wherein the CPU modifies the write pointer to account for a portion of the plurality of data produced by the first peripheral device and not yet stored within the data buffer, thereby producing an adjusted write pointer.

2. The computer system as recited in claim 1, wherein the CPU produces the reload value such that the rate at which the first peripheral device stores the data within the data buffer is substantially equal to the rate at which the second peripheral device fetches the data from the data buffer.

3. The computer system as recited in claim 1, wherein the fraction of the data buffer containing unread data is the number of memory locations between the adjusted write pointer and the read pointer.

4. The computer system as recited in claim 1, wherein the data buffer comprises a portion of a system memory operably coupled to the CPU.

5. The computer system as recited in claim 1, wherein the first peripheral device is an audio signal processor, and wherein the second peripheral device is an audio device configured to drive a speaker.

6. A computer system, comprising:
   a system memory configured to store data and comprising a data buffer, wherein a fraction of the data buffer contains unread data;
   an expansion bus adapted for coupling to one or more peripheral devices;
   a bus bridge coupled between the system memory and the expansion bus;
   a central processing unit (CPU) coupled to the bus bridge and configured to determine the fraction of the data buffer containing unread data and to produce a reload value in response to the fraction;
   a first peripheral device coupled to the expansion bus, wherein the first peripheral device is configured to produce a plurality of data prior to storing the plurality of data within the data buffer, and wherein the first peripheral device comprises a reload register, and wherein the rate at which the first peripheral device stores the data within the data buffer is dependent upon the contents of the reload register, and wherein the first peripheral device is configured to receive the reload value and to store the reload value within the reload register;
   a second peripheral device coupled to the bus bridge, wherein the second peripheral device is configured to fetch the data from the data buffer;
   wherein the data buffer includes a read and write pointers, and wherein the write pointer is the address of the next available memory location within the data buffer for storing data, and wherein the read pointer is the address of the next memory location containing unread data within the data buffer; and
   wherein the CPU modifies the write pointer to account for a portion of the plurality of data produced by the first peripheral device and not yet stored within the data buffer, thereby producing an adjusted write pointer.

7. The computer system as recited in claim 6, wherein the CPU produces the reload value such that the rate at which the first peripheral device stores the data within the data buffer is substantially equal to the rate at which the second peripheral device fetches the data from the data buffer.

8. The computer system as recited in claim 6, wherein the fraction of the data buffer containing unread data is the number of memory locations between the adjusted write pointer and the read pointer.

9. The computer system as recited in claim 6, wherein the data comprises audio data, and wherein the first peripheral device comprises:

a divider circuit comprising the reload register, wherein the divider circuit is configured to produce a frame batch clock signal having a period dependent upon the contents of the reload register; and a signal processor coupled to receive the frame batch clock signal and configured to produce the audio data, wherein the signal processor initiates processing of a predetermined number of audio signal samples in response to the frame batch clock signal.

10. The computer system as recited in claim 6, wherein the first peripheral device is an audio signal processor, and wherein the second peripheral device is an audio device configured to drive a speaker.

11. A computer system, comprising:
   a system memory configured to store data and comprising a data buffer, wherein a fraction of the data buffer contains unread data;
   an expansion bus adapted for coupling to one or more peripheral devices;
   a bus bridge coupled between the system memory and the expansion bus;
   a central processing unit (CPU) coupled to the bus bridge and configured to determine the fraction of the data buffer containing unread data and to produce a reload value in response to the fraction;
   a first peripheral device coupled to the expansion bus, wherein the first peripheral device is configured to produce a plurality of audio data prior to storing the plurality of audio data within the data buffer, and wherein the first peripheral device comprises:
      a divider circuit comprising:
         a reload register; and
         a counter coupled to the reload register and coupled to receive a master clock signal having a predetermined period, wherein the divider circuit is configured to produce a frame batch clock signal in response to the master clock signal and having a period dependent upon the contents of the reload register; and
      a signal processor coupled to receive the frame batch clock signal and configured to produce the plurality of audio data, wherein the signal processor initiates processing of a predetermined number of audio signal samples in response to the frame batch clock signal;
   a second peripheral device coupled to the bus bridge, wherein the second peripheral device is configured to fetch the data from the data buffer;
   wherein the data buffer includes a read and write pointers, and wherein the write pointer is the address of the next available memory location within the data buffer for storing data, and wherein the read pointer is the address of the next memory location containing unread data within the data buffer; and
   wherein the CPU modifies the write pointer to account for a portion of the plurality of data produced by the first peripheral device and not yet stored within the data buffer, thereby producing an adjusted write pointer.

12. The computer system as recited in claim 11, wherein the first peripheral device is configured to receive the reload value and to store the reload value within the reload register.

13. The computer system as recited in claim 11, wherein the counter produces a plurality of binary output signals representing a binary value, and wherein the binary value is decremented during each cycle of the master clock signal, and wherein when the binary values of all counter output signals are 0, the counter outputs are set to the corresponding values stored within the reload register.

14. The computer system as recited in claim 13, wherein the frame batch clock signal is the value of the most significant binary output signal produced by the counter.

15. The computer system as recited in claim 11, wherein the fraction of the data buffer containing unread data is the number of memory locations between the adjusted write pointer and the read pointer.

16. A method for equalizing the rate at which a first peripheral device stores data within a data buffer and the rate at which a second peripheral device fetches the data from the data buffer, wherein the first peripheral device produces a plurality of data prior to storing the plurality of data within the data buffer, and wherein the data buffer comprises read and write pointers, the method comprising:

obtaining the values of the read and write pointers;

computing an adjusted write pointer, wherein the adjusted write pointer value accounts for a portion of the plurality of data produced by the first peripheral device and not yet stored within the data buffer;

determining the number of memory locations between the adjusted write pointer and the read pointer;

using the number of memory locations between the adjusted write pointer and the read pointer to compute a reload value delta;

adding the reload value delta to a current reload value to compute a new reload value; and storing the new reload value within a reload register of the first peripheral device.

17. The method as recited in claim 16, wherein the write pointer is the address of the next available memory location within the data buffer for storing data, and wherein the read pointer is the address of the next memory location containing unread data within the data buffer.

18. The method as recited in claim 16, wherein the rate at which the first peripheral device stores the data within the data buffer is dependent upon the contents of the reload register.

19. The method as recited in claim 16, wherein the reload value delta is 0 when the number of memory locations between the adjusted write pointer and the read pointer is approximately equal to half of the total number of memory locations within the data buffer.

20. The method as recited in claim 16, wherein the reload value delta is positive when the number of memory locations between the adjusted write pointer and the read pointer is substantially greater than half of the total number of memory locations within the data buffer.

21. The method as recited in claim 16, wherein the reload value delta is negative when the number of memory locations between the adjusted write pointer and the read pointer is substantially less than half of the total number of memory locations within the data buffer.

* * * * *